3,382,714
HEAT-SENSING INSTRUMENT
Howard B. Miller, Hampton, and William D. Harvey, Newport News, Va., assignors to the United States of America as represented by the Administrator of the National Aeronautics and Space Administration
Filed Dec. 29, 1964, Ser. No. 422,092
3 Claims. (Cl. 73—190)

ABSTRACT OF THE DISCLOSURE

A device for sensing infinitesimal amounts of heat flowing onto a surface at several locations. A support body having several holes drilled in it at each of said locations has a sheet of heat conducting material bonded to it over said holes. A thermocouple junction is connected to the underside of said sheet in each of said holes to sense the heat flowing onto the surface at the several locations.

---

The invention described herein may be manufactured and used by or for the Government of the United States of America for governmental purposes without the payment of any royalties thereon or therefor.

The invention relates generally to a heat-sensing instrument and more specifically concerns a heat-sensing instrument for sensing or detecting infinitesimal amounts of heat flowing onto a surface.

In aerodynamic heat transfer studies, it is necessary to measure infinitesimal amounts of heat flowing onto a surface at many locations on the surface. In the past, this has been done by installing individual capsule-type instruments in the surface. Each of these instruments consists of a thin disk (one or two mils thick) of a known material to the back of which is attached a thermocouple. The disk is supported at its perimeter by a suitable insulator, and this assembly is installed inside a thin case. The thin case is then installed in a hole in the surface under test in such a manner that the disk is flush with the surface. These instruments or gages have to be made individually and installed separately in a series of holes located in the surface under test.

These prior art instruments have many disadvantages. First, since they are individually constructed, a considerable amount of time is used in constructing and installing them. The methods used in fabricating the gages are necessarily slow because of the many operations and numerous parts involved. Second, accurate control of the disk thickness or mass per unit area is a problem since either may be altered during assembly and these parameters are then not accurately known. Third, the disk is easily dimpled during construction and installation. And fourth, it is difficult to aline the disks with the test surface, especially when the surface is curved. For best results, the surface should be smooth and continuous with no irregularities.

It is therefore an object of this invention to provide an improved means for sensing infinitesimal amounts of heat flowing onto a surface.

Another object of this invention is to provide a means for sensing the heat flowing onto a surface using individual gages in which the individual gages are not individually constructed and installed.

A further object of this invention is to provide a means for sensing the heat flowing onto a surface in which the thickness or mass per unit area of the sensing element material is accurately controlled and previously determined.

Still another object of this invention is to provide a means for sensing the heat flowing onto a surface in which the sensing element material is easily alined with the contour of the surface.

A still further object of this invention is to provide a means for sensing the heat flowing onto a surface in which the sensing element material is not likely to be dimpled during construction and installation.

Yet another object of this invention is to provide a means for sensing the heat flowing onto a surface which is sufficiently sensitive to eliminate expensive amplification of its output signal.

To realize the above objects, this invetnion takes the form of attaching a continuous thin sheet of a material having a previously known thickness, density and specific heat to a supporting surface through which a series of holes of a known diameter has been previously made. Thus, each perforated area, with the known material stretched across it, forms a calorimeter. By attaching thermocouples to the under surface of the thin material through each perforated area, the heat flowing onto the surface can be measured. Since very high sensitivity is needed to detect heat in infinitesimal amounts, the successful application of this invention depends on being able to attach over the perforation sheets of sensing material having a total thickness of two mils or less. In cases where the time of rate of change is measured in milliseconds, or the amount of heat present produces only a fractional degree of total temperature change, then this invention becomes practical because the sensing material stretched across the perforated openings acts like individual calorimeter gages for sensing low heating rates.

Other objects and advantages of this invention will further become apparent hereinafter and in the drawings, in which.

Figure 1:
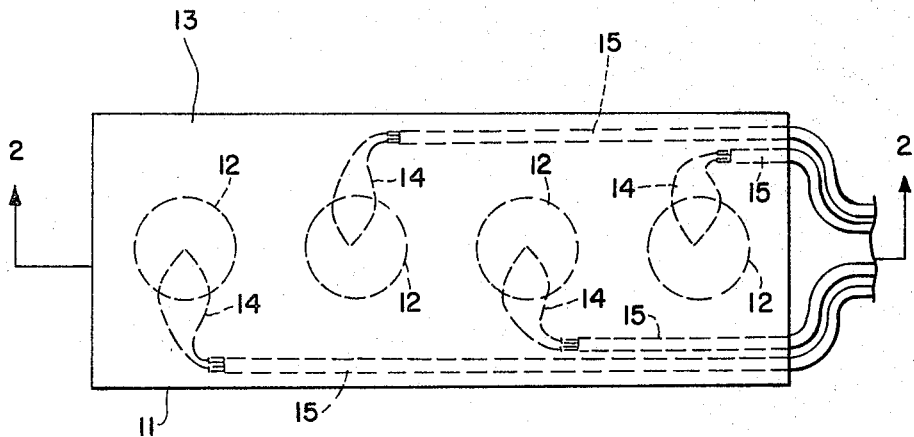
FIG. 1 is a top view of a preferred embodiment of this invention.

In describing the preferred embodiment of the invention illustrated in the drawing, specific terminology will be resorted to for the sake of clarity. However, it is not intended to be limited to the specific terms so selected, and it is to be understood that each specific term includes all technical equivalents which operate in a similar manner to accomplish a similar purpose.

Figure 2:
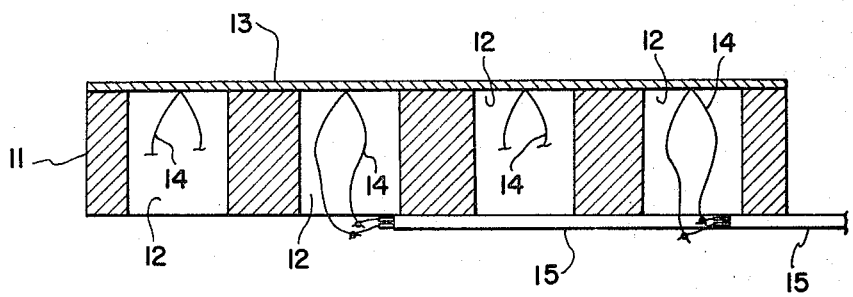
FIG. 2 is a sectional view taken substantially along the line 2—2 of FIG. 1.

Turning now to the preferred embodiment of this invention shown in FIGS. 1 and 2 of the drawing, the number 11 designates a support body through which several gage holes 12 are machined or drilled. Stretched on the top surface of support body 11 and bonded thereto is a sheet of sensing material 13. Thermocouple wires 14 are attached by spot welding to the under surface of the sheet of sensing material 13 at the centers of the holes 12. Thermocouple wires 14 are also connected to thermocouple leads 15 which are connected to suitable recording equipment (not shown). Each of the holes 12, with the sensing material 13 stretched over it, is a calorimeter. By attaching the thermocouple wires 14 to each of these calorimeters, the heat flowing into it can be measured. The diameters of thermocouple wires 14 should be smaller than the thickness of material 13 for best results.

The shape of the holes 12 are shown as being round; however, they can be any shape without departing from the spirit or scope of this invention. It is only necessary that an accurate determination of the cross-sectional area of the holes can be made so that the amount of sensing material 13 covering the holes can be determined. The size and number of holes 12 that are used depends on the particular application of this invention.

The sheet of sensing material 13 can be made from any good conductor of heat, such as, copper, platinum, silver or stainless steel. The thickness of the material 13 depends on the particular application of this invention. However, it should be noted that this invention becomes much more useful when the thickness of material 13 is two mils or less. Then a sheet of the material 13 can be handled much easier than small disks of the material without damaging the material. The sheet of material 13 is bonded to support body 11 by any suitable bonding material. It is better that the bonding material be a thermal insulating material so that it will insulate the material 13 from support body 11. If support body 11 is itself a thermal insulator, this would not be necessary.

The support body 11 can be the body forming the surface onto which the measured heat is flowing, or it can be a model fitted into the surface, or it can be a model forming the surface. Support body 11 is shown as having a flat surface. However, it can have a curved surface. If it has a three-dimensional curved surface, then it is necessary that the sheet of sensing material 13 be shaped before it is bonded to support body 11.

The advantages of this invention are numerous. This invention simplifies the construction and installation of multiple heat gages thereby resulting in considerable time saving over the construction and installation of previously used gages. The error of dimpling the sensing material is greatly reduced because of the much greater bonding surface provided. In the individual capsule-type gage, bonding of the calorimeter disk is limited to a very small area around the circumference of the disk. A smoother contour of the surface where the heat flow is measured can be maintained with this invention. This invention provides for closer control of the sensing material that is stretched over the perforated areas. The sensing material can be accurately measured for thickness and the thermal properties known before assembly. In the previous individual capsule-type instrument, the possibility existed that each sensor disk could be altered during fabrication. This invention eliminates the need for amplification of its outputs because of the high sensitivities that can be obtained with it.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the following claims.

What is claimed is:

1. An instrument for sensing infinitesimal amounts of heat flowing onto a surface area at several locations on said surface area comprising:
   a support body area including sharply contoured configurations;
   holes formed in said support body area at each of said several locations;
   a single, continuous, smooth sheet of heat conducting material bonded to said support body area over said holes to form the entire surface of said support body area and all of the area being sensed; and
   a thermocouple for each of said several locations with each thermocouple consisting of two wires connected together at one of their ends to form a thermocouple junction which is attached to the under surface of said sheet of heat conducting material under one of said several locations and with the other ends of said two wires extending through the hole corresponding to said one location whereby the voltage generated across said thermocouple junctions are indicative of the heat flowing onto said surface at said several locations.

2. An instrument in accordance with claim 1 wherein said sheet of heat conducting material is less than three mils thick.

3. An instrument in accordance with claim 1 wherein said thermocouple wires are attached to the under surface of said sheet at approximately the centers of said holes.

References Cited

UNITED STATES PATENTS

| | | | |
|---|---|---|---|
| 2,921,972 | 1/1960 | Kreisler et al. | 136—214 |
| 3,008,029 | 11/1961 | Davis et al. | 73—15 X |
| 3,194,071 | 7/1965 | Hager | 73—341 |
| 3,232,113 | 1/1966 | Malone | 73—355 |
| 3,280,626 | 10/1966 | Stempel | 73—190 |

OTHER REFERENCES

Gardon, R.: "An Instrument for the Direct Measurement of Intense Thermal Radiation," in the Review of Scientific Instruments (24), p. 366–370, May 1953.

RICHARD C. QUEISSER, *Primary Examiner.*

JAMES J. GILL, *Examiner.*

J. C. GOLDSTEIN, EDDIE E. SCOTT,
*Assistant Examiners.*